United States Patent [19]

Moliard

[11] 4,184,602

[45] Jan. 22, 1980

[54] COLLAPSIBLE EXPANSIBLE CONTAINER

[76] Inventor: Henry Moliard, 942 Avenida Central, Guadalupe (S.J.), Costa Rica

[21] Appl. No.: 910,683

[22] Filed: May 30, 1978

[51] Int. Cl.² .......................... B65D 7/00; B65D 7/24
[52] U.S. Cl. ...................................... 220/4 C; 220/6; 220/7; 220/1.5
[58] Field of Search ............... 220/4 F, 4 R, 4 B, 4 E, 220/4 C, 6, 7, 8, 83, 19, 1.5; 217/16, 48; 229/23 R, 23 BT, 238 T

[56] References Cited

U.S. PATENT DOCUMENTS

| | | | |
|---|---|---|---|
| 1,050,407 | 1/1913 | Verrette | 220/7 |
| 1,120,955 | 12/1914 | Martin | 220/8 X |
| 2,332,652 | 10/1943 | Mackenzie | 217/43 |
| 2,467,518 | 4/1949 | Banks | 217/48 |
| 2,635,302 | 4/1953 | Denning | 20/1.2 |
| 2,814,408 | 11/1957 | Zebarth | 220/6 X |
| 2,821,047 | 1/1958 | Ruiz | 220/6 X |
| 2,851,751 | 9/1958 | Henry | 22/100 |
| 3,205,898 | 9/1965 | Sprague | 130/20 |
| 3,294,034 | 12/1966 | Bodenheimer et al. | 220/1.5 X |
| 3,348,723 | 10/1967 | Wilson | 220/6 |
| 3,951,294 | 4/1976 | Wilson | 220/5 R |

*Primary Examiner*—Steven M. Pollard
*Attorney, Agent, or Firm*—Hill, Van Santen, Steadman, Chiara & Simpson

[57] ABSTRACT

A multiple panel container especially useful for compost tanks, grain bins, and the like storage constructions has pairs of hinged together corner forming panels overlapping with each other or with insert panels. The panels have a plurality of spaced recesses along the width thereof to be aligned at the overlap and receive fasteners fixedly securing the panels together to form the perimeter of an enclosure of desired size which can be covered with a tarpaulin supported from expansible and contractable trusses. The panels can be arranged to provide compartments in the enclosure and to provide access doors. The panels can be folded flatwise and stacked in a compact pile when not in use. The panels can be composed of plywood, metal, sheet plastic material or the like.

6 Claims, 9 Drawing Figures

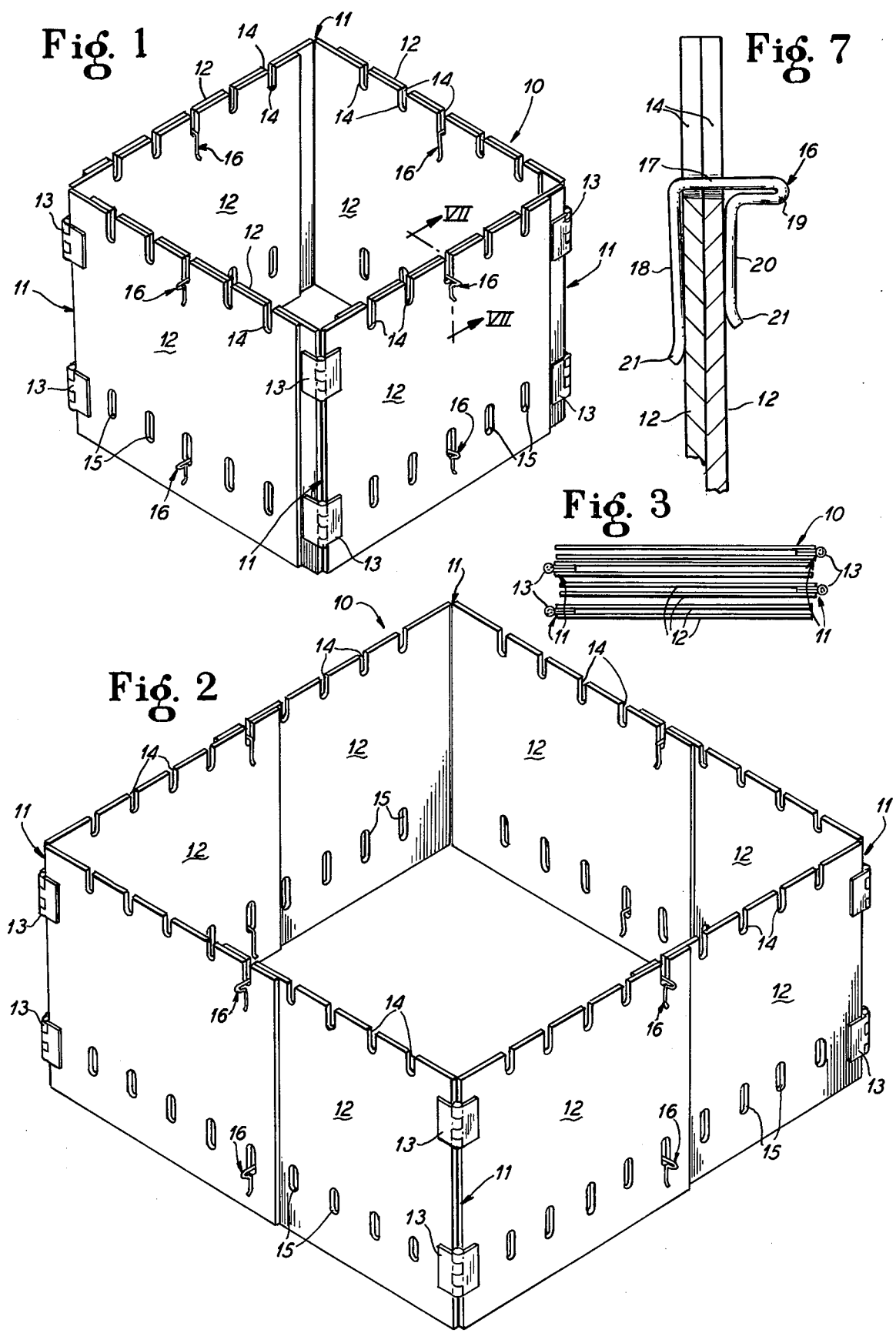

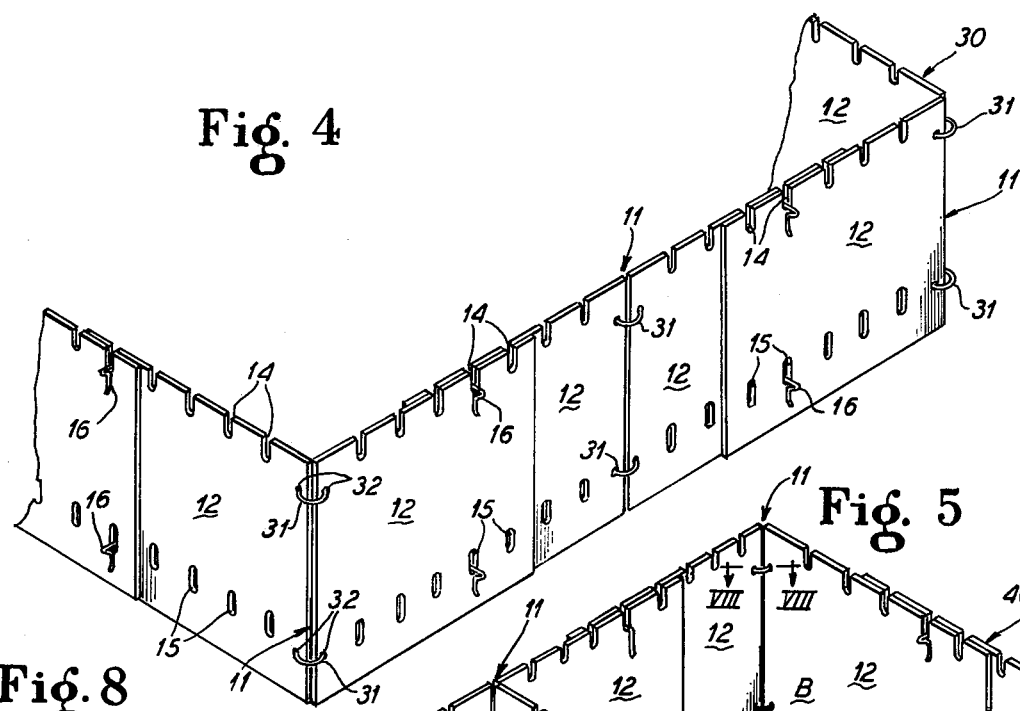
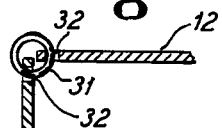
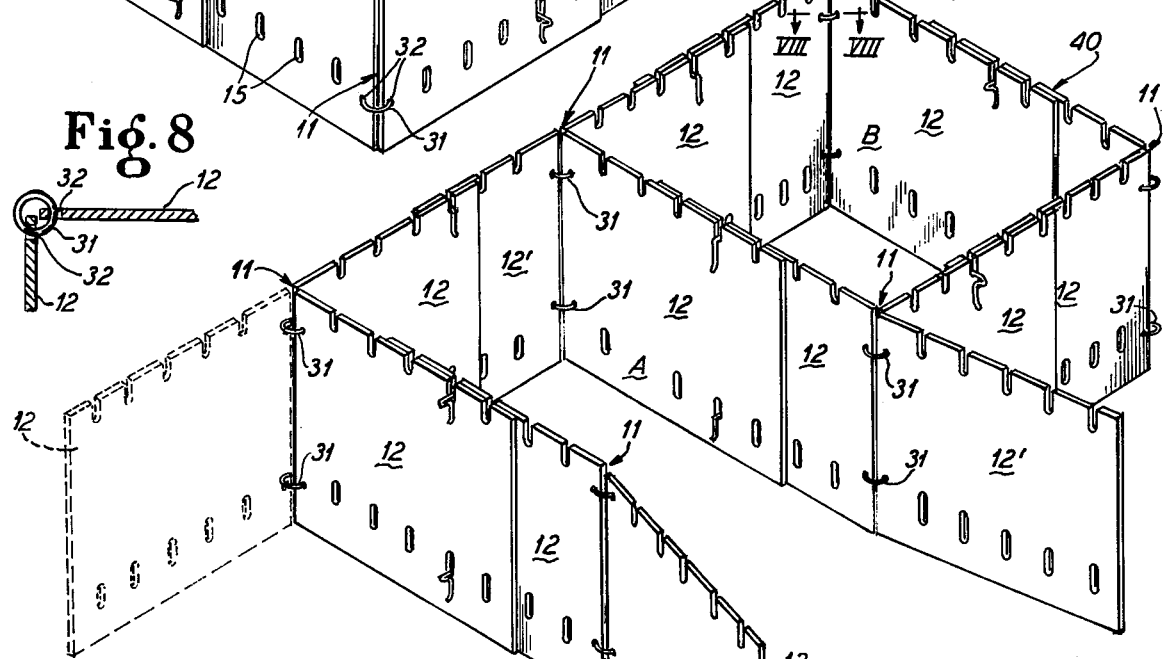
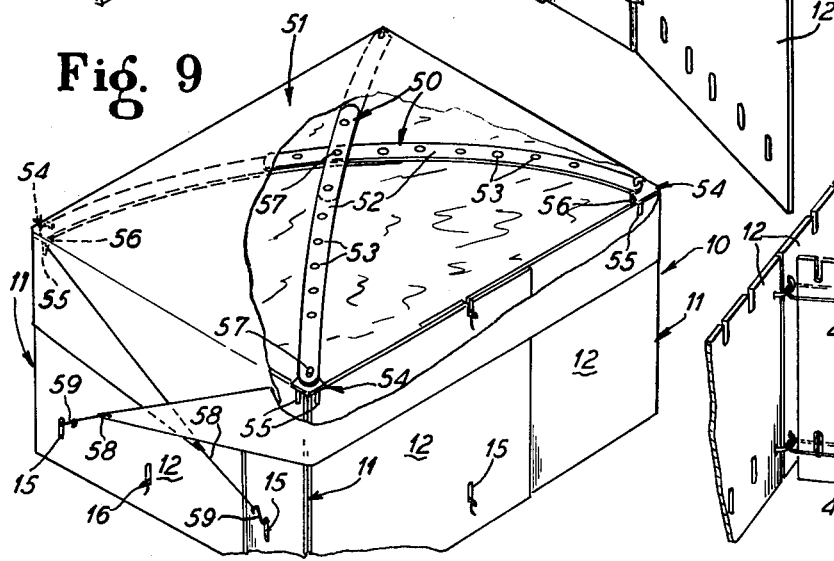
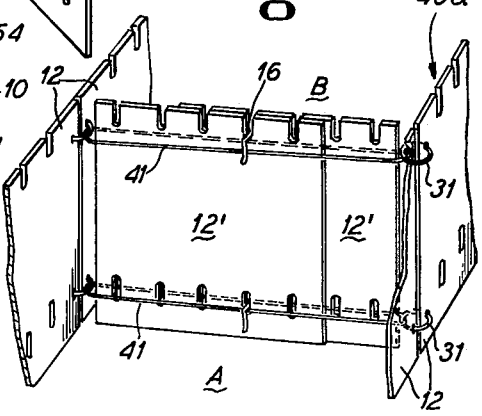

COLLAPSIBLE EXPANSIBLE CONTAINER

FIELD OF THE INVENTION

This invention relates to the art of expansible storage containers and particularly to multiple panel container structures which are easily set up for use, expanded, contracted or compartmentalized as desired during use and collapsible into a compact stack when not in use.

THE PRIOR ART

Heretofore, expansible crates, boxes, bins, and the like could not be collapsed into a flat compact stack when not in use and then set up to form a bin or tank-like enclosure varying from the size of a single panel width to any desired size with the enclosed chamber being compartmentalized as desired and being accessible by displacement of one or more of the panels. The prior art structures were cumbersome, difficult to assemble, and limited in use.

SUMMARY OF THIS INVENTION

A tank, bin, box, crate or the like container is formed from hinged together corner panels which can be fully overlapped to form a small enclosure, can be only partially overlapped to form larger enclosures, can receive interposed similar expansion panels to form still larger enclosures, can be positioned so as to compartmentalize the enclosure and can be displaced to give easy access to the enclosure. The panels have fastener receiving openings spaced along their lengths to be aligned with similar openings in adjacent panels for receiving fasteners to lock the panels together. The panels can be folded flatwise and stacked in a compact pile when not in use. Expansible trusses can be carried by the panels to support a roof, such as a tarpaulin sheet, over the enclosure.

The container of this invention is especially suited for a compost tank which will facilitate decomposition, provide separated zones for successive treating areas and which will have easy access as well as afford protection from the elements. The compost material receiving chamber or chambers are easily varied in size to accommodate varying volumes of compost material in masses which are not too thick or too thin so that decomposition will properly proceed. The panels are sufficiently impervious to trap moisture for expediting the decomposition.

It is then an object of this invention to provide a multiple panel container capable of being stacked in a compact pile when not in use and easily set up to define an enclosure of desired capacity.

Another object of this invention is to provide a container or bin construction formed from hinged together corner panels adapted to be fully overlapped to define a small enclosure, and partially overlapped with each other or with other panels to form enclosures of any desired capacity.

A specific object of this invention is to provide a compost tank composed of panels with fastener receiving openings arranged so that the panels can be locked together in positions varying from fully overlapped to partially overlapped positions.

Another object of the invention is to provide a collapsible, expansible container composed of hinged together corner panels having fastener receiving openings along their length thereof to be aligned with similar openings of adjacent panels to define enclosures of varying sizes and adapted to be folded flatwise into a compact pile.

A specific object of the invention is to provide a compost tank or bin formed from panels locked together in adjustable overlapped relationship to define a compost bed of desired size with desired compartments and with one or more of the panels capable of being displaced to open an access to the bed and with adjustable trusses carried by the panels to support a tarpaulin cover.

Other and further objects of this invention will become apparent to those skilled in this art from the following description of the annexed sheets of drawings, which, by way of preferred examples, illustrates several embodiments of the invention.

ON THE DRAWINGS:

FIG. 1 is a perspective view of a container according to this invention in its contracted condition;

FIG. 2 is a view similar to FIG. 1 but showing the container in an expanded condition;

FIG. 3 is a side elevational view illustrating the manner in which the panels of the container are folded flatwise and stacked into a compact pile;

FIG. 4 is a fragmentary perspective view of a modified container according to this invention;

FIG. 5 is a view similar to FIG. 4 but illustrating the manner in which the container can be compartmentalized and opened up;

FIG. 6 is a fragmentary view similar to FIG. 5 showing an alternate arrangement for positioning and securing a partition wall in the container;

FIG. 7 is enlarged fragmentary cross-sectional view along the line VII—VII of FIG. 1;

FIG. 8 is a fragmentary enlarged cross-sectional view along the line VIII—VIII of FIG. 5;

FIG. 9 is a fragmentary perspective view, with parts broken away to show underlying parts of a container according to this invention equipped with roof trusses and a tarpaulin cover.

AS SHOWN ON THE DRAWINGS:

The container 10 of FIGS. 1 and 2 is composed of four corner units 11, each having a pair of panels 12,12 hingedly connected at one longitudinal side thereof by a pair of hinges 13,13. In FIG. 1, the panels of adjacent corner units 11 are fully overlapped to provide a small enclosure. In FIG. 2, the panels of adjacent corner units 11 are only partially overlapped to provide a larger enclosure.

Each panel 12 has a plurality of top opening grooves 14 spaced in a row across the width of the panel along the top edge thereof.

Each panel 12 also has a plurality of upstanding slot openings 15 spaced in a row along the width of the panel near the bottom thereof.

As shown in FIGS. 1 and 2, the overlapped portions of the panels have the slots 14 and 15 in alignment and fasteners 16 are inserted into at least one set of overlapped slots 14 and 15 to secure the panels in fixed overlapped relation.

As illustrated in FIG. 7, the fasteners 16 may take the form of metal U-shaped clips having a top leg 17, an elongated leg 18 depending from one end of the top leg 17, a reverse bend portion 19 at the other end of the top leg 17 underlying about half of the top leg 17 and having a dependent elongated leg 20 in spaced parallel relation from the leg 18. The free ends of the legs 18 and 20 are outturned at 21. The fastener clip 16 is easily positioned in a slot opening 14 or 15 and pushed to the bottom of the slot so that its legs 18 and 20 will embrace the panels 12. The reverse bend leg 19 provides a handle for easy insertion of the clip into a slot and for removal of the clip from the slot. The legs 18 and 20 slide over the exposed faces of the panels 12 without damaging the panel surfaces.

The hinges 13 will accommodate a folding together of the panels 12 to which they are connected and, as shown in FIG. 3, the container 10 can be collapsed into a compact stack by removing the clips 16 from the slots 14 and 15, separating the corner assemblies 11, and folding together the panels 12 thereof. The four units 11 are then conveniently stacked as shown in FIG. 3.

The container 10 can have the panels 12 composed of plywood, sheet metal or sheet plastics material of any desired size, for example, from about 12 to 48 inches wide and from about 24 to 48 inches wide. The slots 14 and 15 need only be about one inch wide and three inches high and could, of course, be replaced by circular holes of a suitable diameter to accommodate the spring clips 16.

The container 10 can be set on bare ground or on a wood or concrete floor to serve as a compost bin and can be expanded as the compost volume may demand to provide a bed of the desired thickness. The bottom slots 15 may also provide for the aeration of the contents of the container.

The modified container construction 30 of FIG. 4 is formed from the same type corner units 11, panels 12, and slots 14 and 15 as the container 10 of FIGS. 1 and 2, but the hinges take the form of enlarged rings 31 which can be formed of metal, rope or the like freely threaded through holes 32 adjacent adjoining side edges of the panels 12.

An intermediate expansion panel unit 11 is inserted between the corner units 11 with the panels 12,12 thereof swung into aligned planar position and partially underlapping the adjacent panels 12 of the corner units 11. The overlapped slots 14 and 15 are aligned and the metal clip fasteners are inserted to secure the panels together.

The container 30 thus has its storage capacity increased from the expanded capacity of the container 10 by the combined exposed widths of the intermediate panel unit 11. It will, of course, be understood that further extensions can be made to increase the capacity of the container 30 by introducing additional intermediate units 11 in planar position between either or both the side and end panels 12 of the corner units 11.

As shown in FIG. 5, a container 40 composed of the same hinged together units 11 with the ring-type hinges 31 of FIG. 4 can be made with compartments A and B and with swinging doors giving access to a compartment by hinging third panels 12' on the hinges 31 of some of the units 11. Thus, the units 11 having side panels 12 lapping the side panels 12 of the corner units 11 at the righthand end of the container 40 of FIG. 5 can be hinged to third panels 12' which in turn can lap side panels 12 of next adjacent units 11. The lapped panels 12 and 12' can swing open giving access to compartment A as shown. Likewise, the corner panel units 11 at the lefthand end of the container 40 can have their end panels swung from the overlapped position closing the compartment A to an opened position shown in dotted lines giving access to or enlarging the compartment A.

It will also be understood that the compartments A and B can be expanded by inserting additional hinged together panel units 11 as in FIG. 4 or can be contracted by additional overlapping of the partially overlapped panels.

As shown by the container 40a in FIG. 6, instead of hinging the panels 12' on the ring hinges 31 for forming the compartment partition wall of the container 40, free panels 12' can be slipped into loops 41 of cables or ropes spanning the space between the side walls. The cables or ropes are threaded through the top and bottom ring hinges 31 of the adjacent planar side panel units. The loops serve to tie together the opposite side walls of the container and the panels will be held upright in position to provide the partition wall between the compartments A and B.

As shown in FIG. 9, a container of this invention, such as the container 10, can support trusses 50 for a tarpaulin cover 51 to provide a roof for the open top of the container. The trusses 50 are in the form of pairs of aligned overlapped arcuate metal strips 52 with holes 53 spaced along the lengths thereof. Brackets 54 rest on the top edges of the panels 12 of the corner units 11 at the hinged together corners thereof and have two dependent legs or pins 55 embracing the outer faces of the panels with a third intermediate leg 56 embracing the inner faces of the panels at the corner to thereby seat the brackets 54 on the top edges of the corners of the container 10.

Pins 57 project upwardly from the brackets 54 through the end holes 53 of the truss strips 52 thereby supporting the ends of the trusses at the corners of the container. The inner ends of each pair of strips 52 forming a truss 50 overlap each other and one truss overlaps the other at a crossover point at the apex of the assembly. Bolts or other fasteners 57 inserted through registering holes unite the strips and the trusses.

The trusses 52 thus provide an arch support for the tarpaulin 51.

The tarpaulin may be affixed to the container 10 by draping the ends and sides thereof over the panels 12 and cross folding the end portions into triangular flaps with their peaks connected to cables or ropes 58 which are secured to the panels 12 forming the end walls of the container by means of hooks 59 anchored in the slots 15 as shown in FIG. 9.

The trusses 52 will accommodate expansion or contraction of the container 10 as described in FIGS. 1 and 2 by decreasing or increasing the overlap mating inner end portions thereof.

From the above descriptions, it will, therefore, be clear to those skilled in this art that this invention provides a fully collapsible, expansible and contractable container composed of hinged panel units with fastener receiving openings for securing the panels in a desired overlapped relationship and with panels arranged for compartmentalizing the storage space provided by the container and for giving access to the storage space.

I claim as my invention:

1. A container comprising a plurality of panel units each composed of a plurality of panels and hinges connecting one side of each panel in adjoining relation, said hinges acccommodating swinging of the panels from collapsed adjacent relation to extended positions radiating from the hinges, each of said panels having a plurality of rows of openings spaced along with widths thereof adapted to be aligned with openings in adjacent overlapped panels, fasteners seated in some of said openings holding the adjacent panels in desired overlapped condition, and said fasteners being easily removable from said openings to accommodate shifting of the panels on all sides to contract or expand the volume of a chamber surrounded by the panels and said panels forming doors swingable about said hinges to provide side access to the container.

2. The container of claim 1 wherein said units have panels disposed in angular relation to provide corners for the container.

3. The container of claim 1 including selectively length adjustable truss strips mounted on top of some of the panels spanning the space enclosed by the container and a roof supported by said truss strips, said strips being adjusted to correspond to a selected container size in cooperation with said overlapping panels.

4. The container of claim 1 wherein one row of openings are open topped slots at the top edge of each panel and the other row of openings are apertures adjacent the bottom of each panel.

5. The container of claim 1 wherein each of said panels have the plurality of rows of openings spaced along the widths thereof positioned at the top and bottom of each panel.

6. The container of claim 5 wherein the row of openings positioned at the top of each panel opens through the top edge of the panel.

* * * * *

UNITED STATES PATENT AND TRADEMARK OFFICE
CERTIFICATE OF CORRECTION

PATENT NO. : 4,184,602
DATED : January 22, 1980
INVENTOR(S) : Henry Moliard

It is certified that error appears in the above-identified patent and that said Letters Patent are hereby corrected as shown below:

In column 3, line 18, cancel "wide" second occurrence, and insert -- high -- therefor.

Signed and Sealed this

Fifth Day of May 1981

[SEAL]

Attest:

RENE D. TEGTMEYER

*Attesting Officer*  *Acting Commissioner of Patents and Trademarks*